United States Patent [19]

Davis, Jr. et al.

[11] 4,194,093
[45] Mar. 18, 1980

[54] KEY SYSTEM PROTECTIVE APPARATUS

[75] Inventors: Orland L. Davis, Jr.; Charles E. Moore, Jr., both of Corinth, Miss.

[73] Assignee: International Telephone and Telegraph Corporation, New York, N.Y.

[21] Appl. No.: 964,620

[22] Filed: Nov. 29, 1978

[51] Int. Cl.² ..................... H04M 1/00; H04Q 5/18
[52] U.S. Cl. ........................ 179/99 R; 179/81 R; 179/16 E
[58] Field of Search ............ 179/99 AU, 81 R, 84 R, 179/18 F, 18 FA, 16 E, 16 EA, 16 EC, 84 A

[56] References Cited

U.S. PATENT DOCUMENTS

| | | | |
|---|---|---|---|
| 2,830,128 | 4/1958 | Radcliffe, Jr. et al. | 179/16 E |
| 3,166,642 | 1/1965 | Abbott | 179/16 E |
| 3,925,624 | 12/1975 | Earle et al. | 179/81 R |
| 3,996,426 | 12/1976 | Lancaster | 179/99 |
| 4,039,763 | 8/1977 | Angner et al. | 179/99 |
| 4,057,693 | 11/1977 | Angner et al. | 179/99 |
| 4,101,740 | 7/1978 | Barsellott | 179/99 |
| 4,103,112 | 7/1978 | Korsky | 179/81 R |
| 4,132,870 | 1/1979 | Liu | 179/81 R |
| 4,145,579 | 3/1979 | Angner et al. | 179/81 R |

Primary Examiner—Gerald Brigance
Attorney, Agent, or Firm—James B. Raden; Marvin M. Chaban

[57] ABSTRACT

A circuit for apparatus to be used with a key system line card for providing electrical isolation between the line circuit and the central office. The adapter responds to ring current from the central office to close a path to the line circuit to cause the line circuit to respond. The circuit provides two-way supervision responding to change of conditions either at the station or at the central office, and also provides a time delay to prevent the circuit from entering the hold condition improperly.

6 Claims, 2 Drawing Figures

KEY SYSTEM PROTECTIVE APPARATUS

BACKGROUND OF THE INVENTION

Line cards for key telephone circuits are a highly developed art in which one of the earliest patents using the present approach is U.S. Pat. No. 3,436,488 issued Apr. 1, 1969 to R. Barbato et al. A number of patents followed such as U.S. Pat. No. 3,647,983 issued Mar. 7, 1972 to A. Fitzsimmons et al, U.S. Pat. No. 3,715,516 issued Feb. 6, 1973 to J. Ebrahimi and U.S. Pat. No. 4,064,373 issued Dec. 20, 1977 to E. Pinede et al. The first named of these is the well-known Bell System 400-D line card which is and has had heavy usage in the key system area. The second noted and last noted patents show commercially sold variations known as the San/Bar 4000 card and the ITT 400-E card.

Given that line cards have been in existence for many years, it has now been mandated by the Federal Communications Commission that protection be imposed between the key system and the nationwide telephone network. Protection of a number of types is acceptable.

This protection may be inserted in the wiring of the premises and may be fully protected, protected against contact with commercial power wiring, or may be designed for protection without the use of protective devices.

SUMMARY OF THE INVENTION

The present invention is directed to a protective device adapted to be applied to a key telephone line circuit and to interface between that circuit and the central office. The protective apparatus includes a transformer coupling between the central office line and the line circuit. The device responds to ring current from the central office or from the station. The unit responds to a closed line loop or to a hold condition at the station to hold the C.O. line. The device may be directly connected to a line circuit by three conductors to provide the features indicated while imposing protection and also regulating current to the line loop.

It is therefore an object of the invention to provide an improved protective device for a key telephone system.

It is a further object of the invention to provide a protective interface adapted to be connected to a key system line circuit to isolate the line circuit and key system from the national telephone network.

It is a still further object of the invention to provide a circuit adapted to be directly connected to the C.O. side of a conventional line circuit to provide an inductive coupling between the C.O. and the line circuit while bidirectionally forwarding all signals and speech.

It is a still further object of the invention to produce a protective device for a key telephone unit which supplies two-way supervision for the KTU.

DETAILED DESCRIPTION OF THE DRAWINGS

Figure 1:
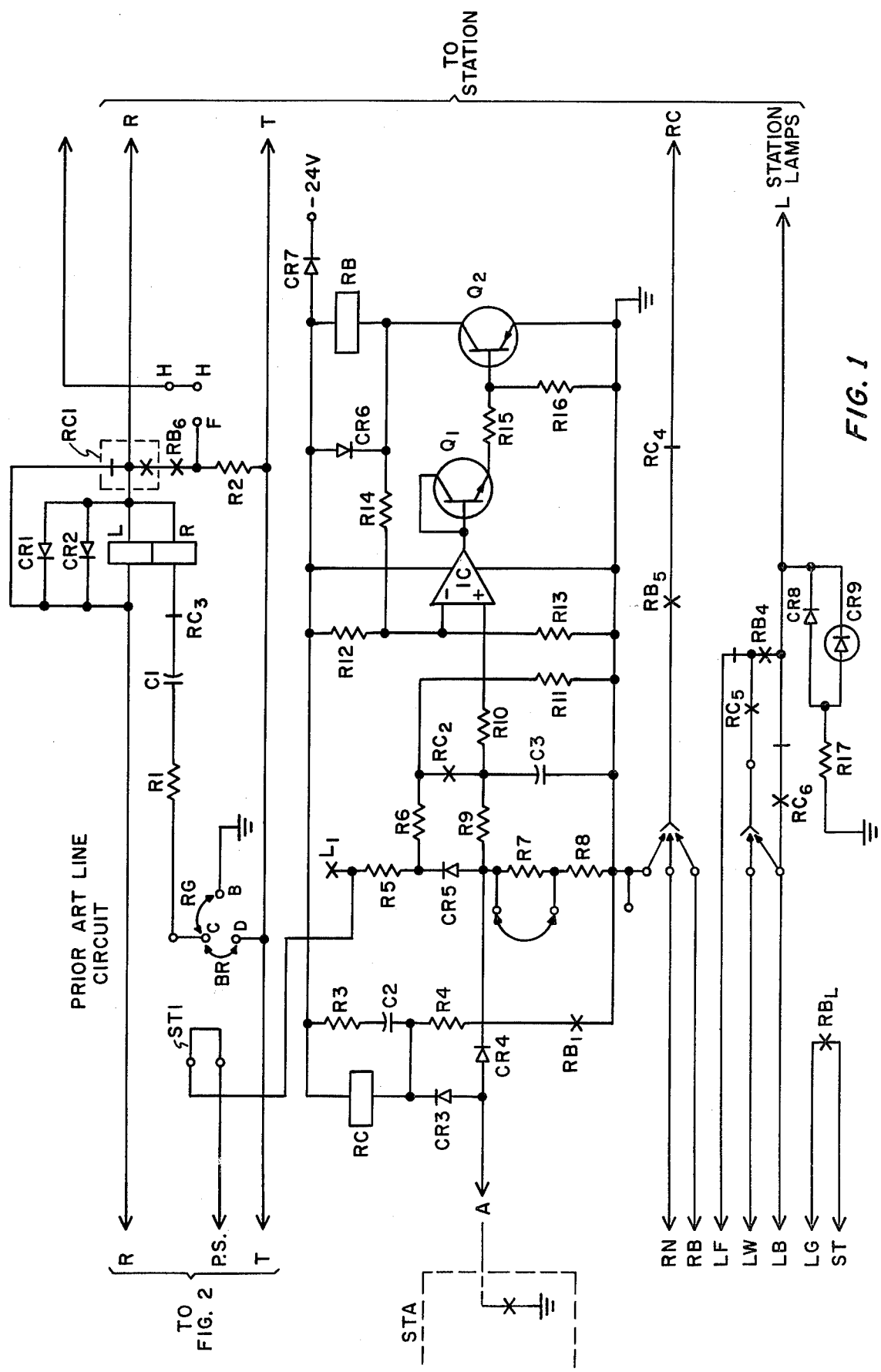
FIG. 1 is a schematic circuit diagram of a conventional line card as known in the prior art.

In FIG. 1 is shown a line circuit drawing essentially that shown and described in detail in U.S. Pat. No. 4,064,373 issued Dec. 20, 1977 to E. Pinede et al, and known in the art as the ITT 400-E line card or line circuit. Note that the two terms, line card and line circuit, are used interchangeably herein to denote a circuit such as that of FIG. 1 usually mounted on a single printed circuit board or card.

Figure 2:
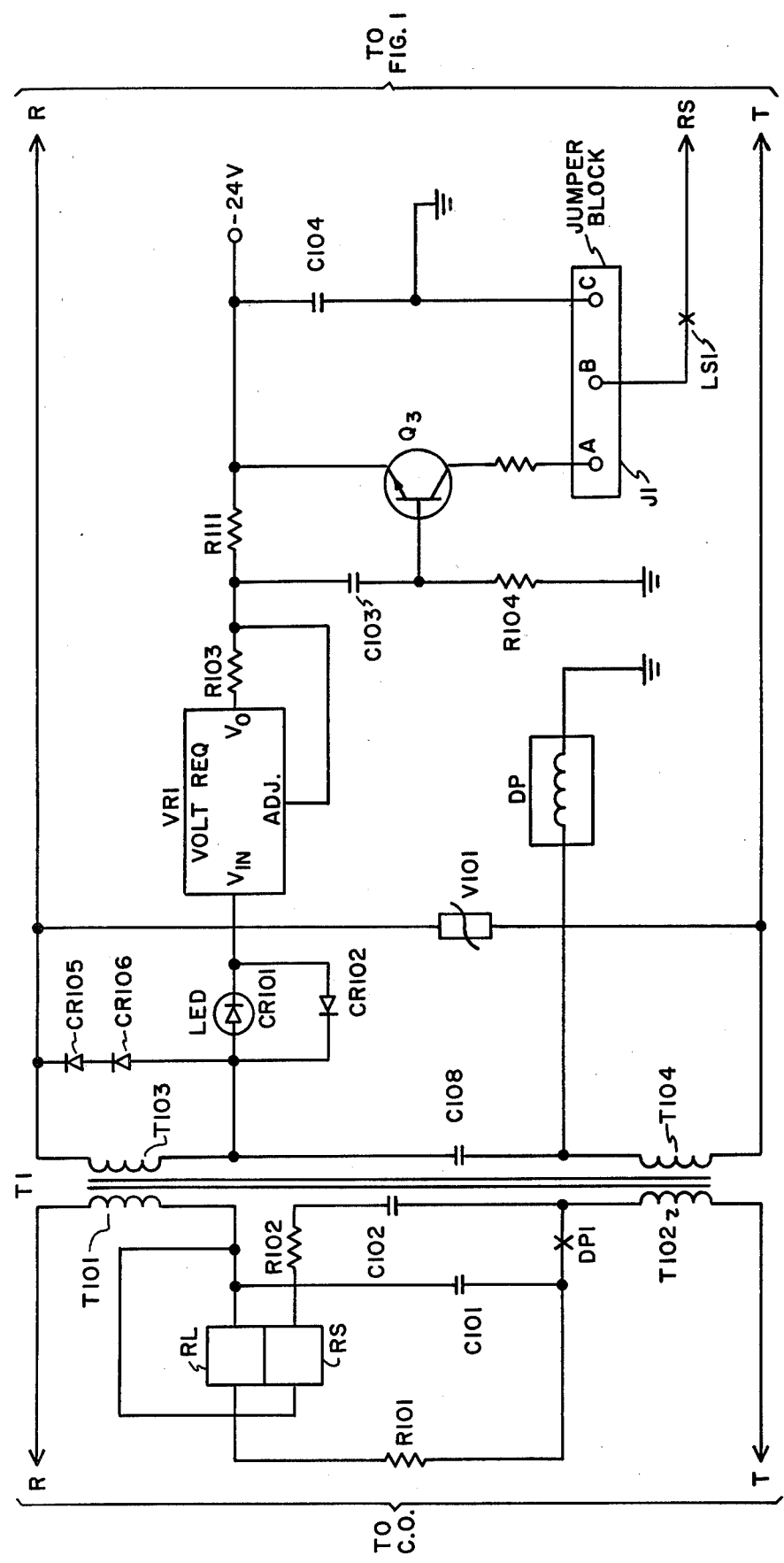
FIG. 2 is a schematic circuit diagram of a protective apparatus of the present invention.

The line circuit of FIG. 1 will be briefly described relative to its usual mode of operation and to explain thereafter its relation with FIG. 2. The circuit of FIG. 1 includes three relays— the LR relay, the RB relay and the RC relay. The circuit of FIG. 1 responds to ringing current over its tip and ring leads from the Central Office (C.O.) to cause the LR relay to operate over its lower or R winding with strap BR closed between terminals C and D for bridged ringing. Contacts L1 of the LR relay close to start a ringing cycle by operating the RB relay. With the RB relay operated, ring current is generated and sent over lead RC to the station being rung.

When the called station answers, ground appears on the A lead to close the RC lead to −24 volt battery. The RC relay operates. The closed line loop through the called station over the tip and ring leads closes a path over the L winding of the RL relay to the tip and ring at the C.O. side of the card (designated RPD in FIG. 1) for completion of a path to the C.O. Ring relay RB is deenergized and a direct speech path over the T and R leads is closed between station and C.O.

When the station of the line circuit goes on hold by depressing the generally known hold button, the first response is removal of the ground from the A lead. Relay RC remains operated for a timed period governed by the R-C combination of resistor R3 and capacitor C2. Relay RL remains operated to close paths to both relays RC and RB. The resistance bridge through contacts RC1 and RB6 and resistor R2 maintain a closed path to the C.O. end over the T and R leads to hold the line in its operated condition.

In the line circuit of FIG. 1, the ring winding of RL relay has a resistance which may be in the range of 700 to 900 ohms. The resistance of the L winding is a low resistance which may be about 40 ohms. This resistance remains in the speech path and therefore must be of low value to provide a minimum of a loss to speech signals transmitted over the line.

For a more detailed explanation of the operation of the line card, reference should be made to the U.S. Pat. No. noted previously, i.e., 4,064,373.

The circuit of FIG. 2 shows the protection apparatus of the invention. The circuit has a C.O. side coupled to the line to the C.O. and the national telephone network. Two leads, a tip and a ring lead, are directed to the C.O.

The KTU (Key Telephone Unit) or line card side of the circuit has three leads, a tip lead, a ring lead and a power signal lead.

At the C.O. side of the circuit of FIG. 2, the tip and ring leads are coupled to the primary hybrid transformer T1. The connection between the two primary windings T101 and T102 of the transformer is the RS (ring sense) winding of the RS-LS relay in series with a capacitor C102. Capacitor C102 may be a 1 ufarad capacitor. The resistance of the RS winding may be identical to that of the R winding of the RL relay in fact the same relay may be used for both applications. Both the RL relay and the RS-LS relay have one make contact set. The contact set LS1 of relay RS-LS is in the path of the power signal lead, as will be explained.

On the secondary side of transformer T1, there is a large capacitor C108 bridging the connection between the secondary windings T103 and T104.

A relay DP with a single winding and one end of its coil grounded is connected between capacitor C108 and transformer winding T104. A 24 volt d.c. source is connected through a resistance R111 of a timing circuit to a voltage regulator VR1 and in series therewith to an LED indicator circuit to the junction of transformer winding T103 and capacitor C103. Connected across winding T103 is a diode series pair CR105, 106 forming a clipper circuit to clamp undesirable inductive transients arising out of the use of rotary dial contacts. The voltage regulator VR1 may be an adjustable three terminal voltage regulator such as that sold as an off-the-shelf item under the designation LM317 by Texas Instruments, Inc.

The voltage regulator allows the use of an inexpensive power supply in that the regulator acts to regulate current in the line loop and to regulate speech voltage as the talking battery. The regulator also acts to attenuate noise, and ripple effects generated by the 24 volt supply.

A metal oxide varistor V101 is connected across the line card conductors to T and R for conventional surge protection.

The power signal output conductor of the protective circuit is connected to the PS terminal of the line card with strap ST1 of FIG. 1 in place. The tip and ring conductors of the protective circuit may be directly connected to the T and R leads at the C.O. side of the line circuit of FIG. 1.

The timing circuit operates as follows. In the off-hook mode, transistor Q3 is biased on by base resistor R104. Resistor R111 serves as a voltage dropping resistor which, in combination with the base-emitter drop of transistor Q3, develops approximately 0.8 VDC across capacitor C103. When the subset goes onhook, current flow in the key system loop ceases which causes capacitor C103 to pull current from the base of transistor Q3. This action turns off transistor Q3 for a time interval which is determined primarily by the R-C constant determined by resistor R111 and capacitor C103. After capacitor C103 is discharged, transistor Q3 is again turned on by resistor 104. When the subset goes onhook, the 24 VDC level on the power signal lead is reduced to zero volts for about 23 milliseconds.

The purpose of the timing circuit is to provide a 23 millisecond "deadtime" in −24 VDC signal to prevent the line card from falsely entering into a hold condition. This was occurring when the subset handset was quickly slammed back onto the cradle when going onhook.

In the operation of the circuit of FIG. 2, when ringing current is applied to the line from the central office, the interrupted ringing passes through winding T101, RS winding, resistor R102, capacitor C102 and winding T102. Relay RS-LS is energized and closes its single set of contacts LS1. Closure of these contacts places approximately −24 volt d.c. source through a strap from terminal A to terminal B of strap terminal block J1 and onto the power signal lead PS. The RS-RL relay follows the ring pulses and pulse the PS lead to charge capacitor C3 of FIG. 1 and operate transistors Q1, Q2 and relay RB to start ringing as previously described. By an obvious change in the strap at the J1 block (from B to C), ground could be supplied to the power signal lead in place of −24 volt battery over an A-B strap.

In this way, the ring relay of the line circuit of FIG. 1 and its contact set L1 is bypassed and ringing in the line circuit is initiated by the ring relay of the protective device. The line card is isolated from the ring current and only receives the interrupted d.c. transmitted through contacts LS1. Within the circuit of FIG. 1, the lead from contacts L1 to the path to −24 volts is opened when the circuit of FIG. 1 is to be used with the device of FIG. 2.

When the station goes off hook, the H lead ground appears on the line circuit A lead to operate the RC relay and cause the ringing to be shut off. The RL relay of the line card is operated in series with the DP relay of the protective device. However, since its contacts L1 are essentially disconnected, no effect of operation of this relay is felt. The d.c. operating path for these relays may be traced from ground at relay DP, winding T104, T lead and T lead of line card, closed station loop, R lead, L winding of relay R1, R leads, winding T103, LED CR101, voltage regulator VR1, resistor R103 and the −24 volt power source.

Relay DP closes its single contact set DP1 to close a d.c. path to the C.O. from the T lead, winding, T102, contacts DP1, resistor R101, RL winding, T101 winding and R lead. Relay RL1 operates to close its contacts LS-1 and again provide negative battery to the power signal lead at the end of the timing period.

The line loop remains closed and speech is passed by the transformer. LED CR101 remains lit to show that the apparatus and the station are in use or busy.

When the station goes on hold, the A lead ground is removed before the line loop opens. Relay RC remains held temporarily. With the ground removed, the negative battery on the power signal lead causes relay B to operate and close the RC1, B6, R2 bridge across the station line. The DP relay remains closed to keep its DP1 contacts closed and hold the C.O. line. Restoration to a closed loop condition again closes the A lead ground to cause relay B to release and the circuit restores to its closed loop state.

When the station goes on hook, the TR loop at the station opens releasing relays RL and DP. After a timed period, relay RC releases. Relay DP opens its contacts DP1 to release the C.O. line.

When the station is off-hook, and begins to dial, relays RL and DP follow the dial pulses. Relay DP transmits these pulses over contacts DP1 to the C.O.

When a call is in process to a closed loop or off-hook condition at the station, release of the line loop causes relay RS-RL to release. This action opens contact set LS-1 to remove its negative battery from resistor R5.

We claim:

1. Apparatus for isolating a line circuit for a key telephone system from the exchange serving the line of the line circuit, said apparatus including a relay connected to said line and having output contacts connected to the line circuit, and transformer means providing d.c. isolation between line conductors to said exchange and line conductors to said line circuit, said relay comprising a ring winding for detecting ringing current from the exchange to energize said line circuit and a second winding responsive to line current in the line conductors of said line circuit for holding said line energized.

2. Apparatus as claimed in claim 1, in which there is a second relay connected to the line circuit line conductors and d.c. isolated from the line conductors to said exchange, said second relay operative to detect drive current in said line circuit line conductors to close an energizing path to said first relay.

3. Apparatus as claimed in claim 1, in which there is a voltage regulator connected to the line circuit line conductors for regulating current in the line loop of said line circuit line conductors.

4. A protective interface device adapted to be interposed between the line conductors of a line circuit and line conductors to the exchange servicing the line circuit, said interface including a first relay connected to the line conductors to said exchange to sense ring current applied to the line from the exchange, and a seond relay connected to the line conductors to the line circuit to sense a direct current loop through the line conductors to said line circuit, means providing d.c. isolation between the line conductors of said line circuit and the line conductors to said exchange to isolate said relays accordingly, said first relay including a contact set for energizing said line circuit, and said second relay including a contact set for energizing said first relay.

5. An interface device as claimed in claim 1, in which said first relay includes a first winding across the line conductors to said exchange and includes a second winding across the line conductors to said exchange when the contact set of said first relay is closed.

6. An interface device as claimed in claim 5, in which said d.c. isolation providing means comprises a hybrid transformer for transmitting speech between the line conductors of said exchange and the line conductor to said line circuit.

* * * * *